(No Model.)

R. TUNGFER.
HEATING APPARATUS.

No. 283,440. Patented Aug. 21, 1883.

Witnesses
John P. Allen
J. Gemmel, Jr.

Inventor.
Robert Tungfer

UNITED STATES PATENT OFFICE.

ROBERT JUNGFER, OF GÖRLITZ, PRUSSIA, GERMANY.

HEATING APPARATUS.

SPECIFICATION forming part of Letters Patent No. 283,440, dated August 21, 1883.

Application filed March 26, 1883. (No model.)

*To all whom it may concern:*

Be it known that I, ROBERT JUNGFER, a subject of the King of Prussia, residing in Görlitz, Prussia, have invented certain new and useful Improvements in Hot-Air Heating Apparatus, of which the following is a specification.

My invention relates to an apparatus for heating air for buildings, and has for its object, first, the absolute absence of iron parts in the furnace, and to obtain for some length of time the necessary hot air by radiation of its parts after the furnace or apparatus has been well heated.

Figure 1:
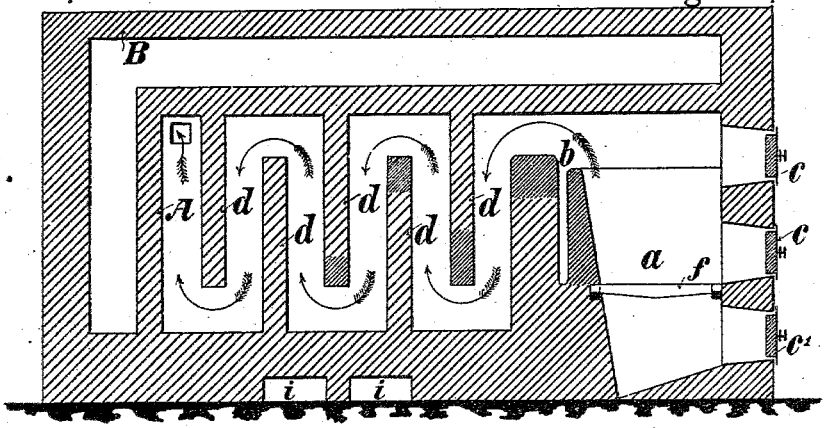
Figure 2:
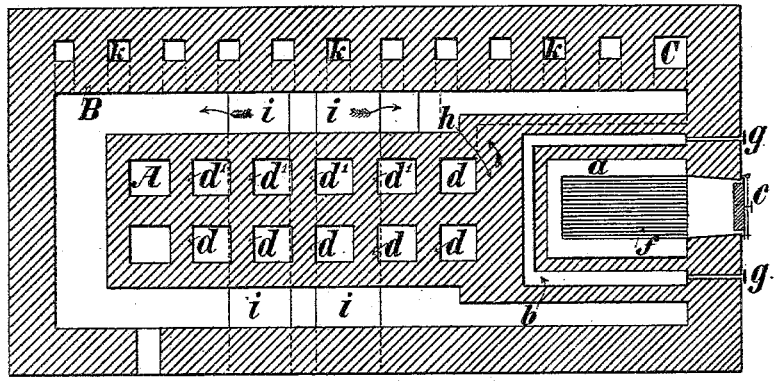
Figure 3:
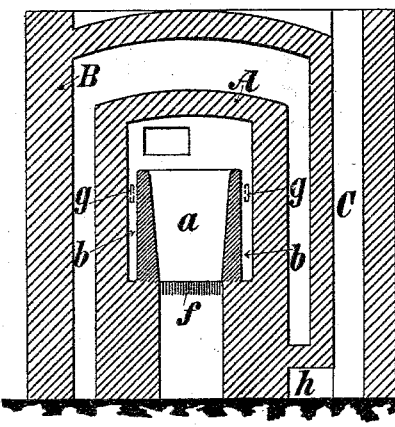

In the accompanying drawings, Figure 1 is vertical longitudinal section of the hot-air apparatus. Fig. 2 is a horizontal section, and Fig. 3 a vertical cross-section, of the same.

The central part or stove proper, A, is provided with a funnel-shaped hearth, $a$, of fire-bricks, and surrounded by flues $b\,b$ at the sides, which, as well as the open top of the hearth, communicate with flues $d\,d$, on one side of a partition-wall, and then through similar flues, $d'\,d'$, on the other side of said partition-wall, into a flue, $h$, to the chimney C.

The flues $d$ and $d'$ are constructed to cause the flame and gases to make a zigzag channel-way, as shown in Fig. 1, and all walls and partitions are constructed of masonry to prevent all unequal expansion of the same, as is unavoidable in stoves made of the combination of iron and masonry. When the fire has been kindled, the grate $f$ or the hearth $a$ is filled with coal through the doors $e\,e$, after which these doors are closed tight, and any further supply of air required for combustion will only be admitted by the ash-hole $c'$ or by slits $g\,g$ communicating with the flues $b\,b$. These slits $g\,g$ can be closed or the entrance of air through the same regulated by suitable doors, and this entering air serves for the complete oxidation of any still incomplete products of combustion.

On account of the great amount of brick-work this stove A is enabled to receive and store up a great amount of heat, and will be able to heat a considerable quantity of air coming in contact with its external surface, and the heating of the same the night previously will effect the heating of the air required during the following day. This stove A is surrounded by a hull or casing, B, of brick-work, forming a space all around the stove A, with which the flues $i\,i$ communicate to supply the air to be heated, and which heated air is distributed then into the passages $k\,k$ communicating with the several apartments in the building to be heated.

The admission of the air through the channels $i$ can be regulated, whereby facility is given to retain the warmed air and to regulate the circulation of the air-current without the necessity of entering the rooms to be heated.

What I claim as my invention, and desire to secure by Letters Patent, is—

An air-heating stove, A, entirely constructed of brick-work, provided with partition-walls forming zigzag flues $d\,d\,d'\,d'$, the funnel-shaped hearth $a$, with surrounding-flue $b$ and the slits $g$, in combination with the surrounding hull or casing B, air-channels $i\,i$, and distributing-passages $k\,k$, the whole being arranged to operate substantially as described, and for the purpose set forth.

In witness whereof I have hereunto signed my name in the presence of two subscribing witnesses.

ROBERT JUNGFER.

Witnesses:
B. ROI,
G. H. SMITH.

Correction in Letters Patent No. 283,440.

It is hereby certified that the name of the patentee of Letters Patent No. 283,440, granted August 21, 1883, for an improvement in "Heating Apparatus," was erroneously written and printed "Robert Tungfer"; that said name should have been written and printed *Robert Jungfer;* and that the patent should be read with this correction therein to make it conform to the record of the case in the Patent Office.

Signed, countersigned, and sealed this 4th day of September, A. D. 1883.

[SEAL.]
M. L. JOSLYN,
*Acting Secretary of the Interior.*

Countersigned:

E. M. MARBLE,
*Commissioner of Patents.*